(12) United States Patent
Hartman et al.

(10) Patent No.: US 9,327,259 B2
(45) Date of Patent: May 3, 2016

(54) APPARATUSES AND METHODS FOR REFORMING OF HYDROCARBONS

(71) Applicant: UOP LLC, Des Plaines, IL (US)

(72) Inventors: William M. Hartman, Des Plaines, IL (US); Xin X. Zhu, Long Grove, IL (US); Lisa M. Lane, Elk Grove Village, IL (US); William Yanez, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 497 days.

(21) Appl. No.: 13/871,271

(22) Filed: Apr. 26, 2013

(65) Prior Publication Data

US 2014/0323781 A1  Oct. 30, 2014

(51) Int. Cl.
| | | |
|---|---|---|
| C10J 3/46 | (2006.01) | |
| B01J 8/04 | (2006.01) | |
| B01J 8/00 | (2006.01) | |
| C10G 35/04 | (2006.01) | |

(52) U.S. Cl.
CPC ............... *B01J 8/0492* (2013.01); *B01J 8/001* (2013.01); *B01J 8/04* (2013.01); *B01J 8/0496* (2013.01); *C10G 35/04* (2013.01); *B01J 2208/0053* (2013.01); *B01J 2208/00176* (2013.01); *B01J 2208/00203* (2013.01); *B01J 2208/00504* (2013.01)

(58) Field of Classification Search
CPC . B01J 8/0442; B01J 19/18; F27D 2099/0051; F10J 3/20; C10J 3/00
USPC ......... 208/63; 48/197.1, 127.1, 127.7, 197 R; 422/630, 625
See application file for complete search history.

(56) References Cited

U.S. PATENT DOCUMENTS

| | | | | |
|---|---|---|---|---|
| 3,069,348 | A | | 12/1962 | Bergstrom |
| 3,069,351 | A | | 12/1962 | Davis |
| 5,264,202 | A | * | 11/1993 | Snyder ................... B01J 23/755 423/652 |
| 6,106,696 | A | * | 8/2000 | Fecteau ..................... B01J 8/12 208/134 |
| 6,436,354 | B1 | * | 8/2002 | Priegnitz ................ B01J 8/0453 422/198 |
| 7,740,751 | B2 | * | 6/2010 | Peters .................... C10G 59/02 208/133 |
| 8,282,814 | B2 | * | 10/2012 | Peters ....................... C10G 9/00 122/37 |
| 2003/0027096 | A1 | * | 2/2003 | Barnett ................... B01J 8/0442 432/180 |
| 2008/0110801 | A1 | * | 5/2008 | Yuan ...................... C10G 59/02 208/63 |

FOREIGN PATENT DOCUMENTS

SU 394410 A1 8/1973

* cited by examiner

*Primary Examiner* — Nina Bhat

(57) ABSTRACT

Apparatuses and methods for reforming of hydrocarbons are presented. In one example, a method comprises burning fuel gas to form a hot flue gas and heat a reforming-zone feedstock that contains ($C_5$-$C_{11}$) hydrocarbons to form a heated reforming-zone feed stream. The heated reforming-zone feed stream is partially reformed to form a partially reformed effluent. The partially reformed effluent is advanced through a process heat recovery coil arrangement that is recovering heat from the hot flue gas to form a heated partially reformed effluent. The heated partially reformed effluent is contacted with reforming catalyst at reforming conditions effective to form a reforming reaction-zone effluent. The reforming reaction-zone effluent comprises $H_2$, $C_5^+$ hydrocarbons including aromatics, and $C_4^-$ hydrocarbons.

20 Claims, 2 Drawing Sheets

APPARATUSES AND METHODS FOR REFORMING OF HYDROCARBONS

TECHNICAL FIELD

The technical field relates generally to reforming of hydrocarbons, and more particularly relates to apparatuses and methods for reforming of hydrocarbons with improved process heat recovery.

BACKGROUND

High octane gasoline is needed for modern gasoline engines. Previously, octane numbers were often improved by incorporating various lead-containing additives into the gasoline. As lead-containing additives have been phased out of gasoline for environmental reasons, it has become increasingly necessary to rearrange the structure of the hydrocarbons used in gasoline blending to achieve higher octane ratings. Catalytic reforming of hydrocarbons is a process widely used by refiners for upgrading the octane ratings of gasoline.

In catalytic reforming, a hydrocarbon feedstock of, for example, $C_5$ hydrocarbons to about $C_{11}$ hydrocarbons, is contacted with a reforming catalyst to convert at least a portion of the heavier hydrocarbons to aromatic hydrocarbons to increase the octane content of gasoline. The catalytic reforming of the heavier hydrocarbons is endothermic and typically requires interstage heating to effectively drive the catalytic reforming reactions to produce a reformate that includes aromatic hydrocarbons. Currently, fuel gas burning radiant heaters that produce heat and hot flue gas are used to provide interstage heating. Refiners are looking for ways to recover waste heat from the hot flue gas to improve processing and production of the reforming products.

Accordingly, it is desirable to provide apparatuses and methods for reforming of hydrocarbons with improved process heat recovery and production of reforming products. Furthermore, other desirable features and characteristics of the present invention will become apparent from the subsequent detailed description and the appended claims, taken in conjunction with the accompanying drawings and this background.

BRIEF SUMMARY

Apparatuses and methods for reforming of hydrocarbons are provided herein. In accordance with an exemplary embodiment, an apparatus for reforming of hydrocarbons comprises a reforming heating-zone. The reforming heating-zone is configured to heat a reforming-zone feedstock that contains ($C_5$-$C_{11}$) hydrocarbons to form a heated reforming-zone feed stream. The reforming heating-zone has a radiant furnace section that is configured to burn fuel gas to form hot flue gas and a common convection section that is in fluid communication with the radiant furnace section to receive the hot flue gas. The reforming heating-zone comprises a process heat recovery coil arrangement that is disposed in the common convection section for recovering heat from the hot flue gas. A reforming reaction-zone receives the heated reforming-zone feed stream. The reforming reaction-zone comprises a plurality of staged reactor catalyst beds that is in fluid communication with the radiant furnace section. An additional reactor catalyst bed is in fluid communication with the process heat recovery coil arrangement. The reforming heating-zone, the plurality of staged reactor catalyst beds, and the additional reactor catalyst bed are cooperatively configured for interstage heating and reforming of the heated reforming-zone feed stream to form a reforming reaction-zone effluent. The reforming reaction-zone effluent comprises $H_2$, $C_5^+$ hydrocarbons including aromatics, and $C_4^-$ hydrocarbons.

In accordance with another exemplary embodiment, an apparatus for reforming of hydrocarbons is provided. The apparatus comprises a combined feed exchanger that is configured for indirect heat exchange between a combined feed stream and a reforming reaction-zone effluent to form a partially heated reforming-zone feed stream. The combined feed stream comprises a recycle $H_2$, $C_6^-$ hydrocarbon-containing net gas stream and a reforming-zone feedstock that contains ($C_5$-$C_{11}$) hydrocarbons. A reforming heating-zone is in fluid communication with the combined feed exchanger. The reforming heating-zone comprises a plurality of radiant heaters including a charge heater and an interstage heater. The plurality of radiant heaters is configured to burn fuel gas to form hot flue gas. The charge heater is configured to heat the partially heated reforming-zone feed stream to form a heated reforming-zone feed stream. A process heat recovery coil arrangement is configured to recover heat from the hot flue gas. A reforming reaction-zone comprises a plurality of staged reactor catalyst beds. The plurality of staged reactor catalyst beds includes a first stage reactor catalyst bed that is in fluid communication with the charge heater and an interstage reactor catalyst bed that is in fluid communication with the interstage heater. The plurality of radiant heaters and the plurality of staged reactor catalyst beds are cooperatively configured for interstage heating and partially reforming of the heated reforming-zone feed stream to form a partially reformed effluent. An additional reactor catalyst bed is in fluid communication with the process heat recovery coil arrangement. The process heat recovery coil arrangement and the additional reactor catalyst bed are cooperatively configured for interstage heating and reforming of the partially reformed effluent to form the reforming reaction-zone effluent. The reforming reaction-zone effluent comprises $H_2$, $C_5^+$ hydrocarbons including aromatics, and $C_4^-$ hydrocarbons.

In accordance with another exemplary embodiment, a method for reforming of hydrocarbons is provided. The method comprises the steps of burning fuel gas to form a hot flue gas and heat a reforming-zone feedstock that contains ($C_5$-$C_{11}$) hydrocarbons to form a heated reforming-zone feed stream. The heated reforming-zone feed stream is partially reformed to form a partially reformed effluent. The partially reformed effluent is advanced through a process heat recovery coil arrangement that is recovering heat from the hot flue gas to form a heated partially reformed effluent. The heated partially reformed effluent is contacted with reforming catalyst at reforming conditions effective to form a reforming reaction-zone effluent. The reforming reaction-zone effluent comprises $H_2$, $C_5^+$ hydrocarbons including aromatics, and $C_4^-$ hydrocarbons.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
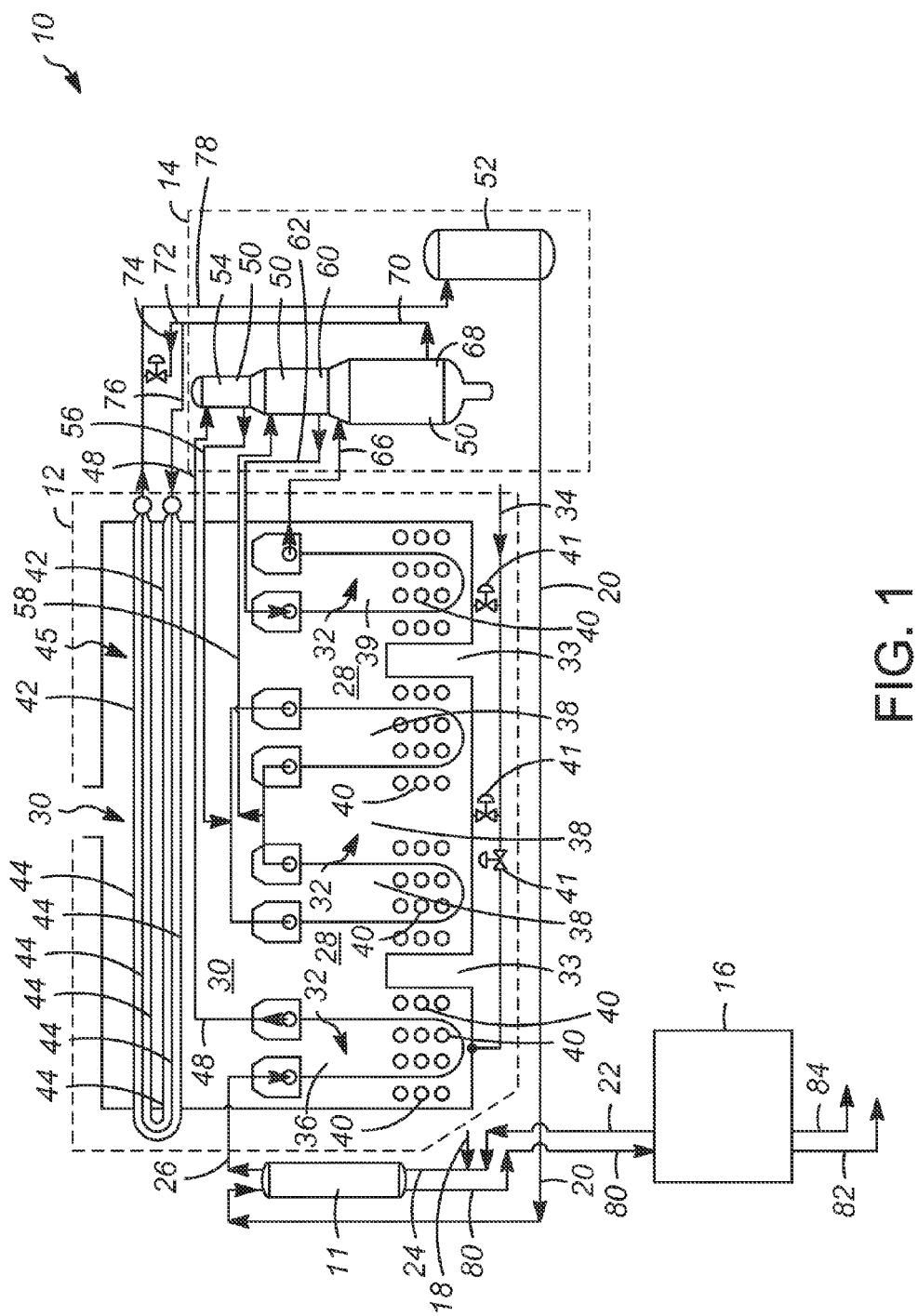
FIG. 1 schematically illustrates an apparatus and method for reforming of hydrocarbons including a process heat recovery coil arrangement in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses and methods for reforming of hydrocarbons. The exemplary embodiments taught herein provide a reforming heating-zone that heats a reforming-zone feedstock that contains ($C_5$-$C_{11}$) hydrocarbons. As used herein, the term "zone" refers to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones. As used herein, $C_x^+$ means hydrocarbon molecules that have "X" number of carbon atoms, $C_x^+$ means hydrocarbon molecules that have "X" and/or more than "X" number of carbon atoms, and $C_x^-$ means hydrocarbon molecules that have "X" and/or less than "X" number of carbon atoms.

In an exemplary embodiment, the reforming heating-zone has a radiant furnace section that burns fuel gas to form hot flue gas and generate process heat to form a heated reforming-zone feed stream. A common convection section is in fluid communication with the radiant furnace section to receive the hot flue gas. Disposed in the common convection section is a process heat recovery coil arrangement for recovering heat from the hot flue gas.

A reforming reaction-zone receives the heated reforming-zone feed stream. The reforming reaction-zone has a plurality of staged reactor catalyst beds that is in fluid communication with the radiant furnace section. An additional reactor catalyst bed is in fluid communication with the process heat recovery coil arrangement. The plurality of staged reactor catalyst beds and the additional reactor catalyst bed cooperate to reform the heated reforming-zone feed stream while the reforming heating-zone including the radiant furnace section and the process heat recovery coil arrangement provide heating including interstage heating to drive the catalytic reforming reactions to form a reforming reaction-zone effluent. The reforming reaction-zone effluent comprises $H_2$, $C_5^+$ hydrocarbons including aromatics, and $C_4^-$ hydrocarbons. By recovering heat from the hot flue gas with the process heat recovery coil arrangement, the recovered heat can be returned to the reforming process for interstage heating of the reforming-zone feed stream for introduction to the additional reactor catalyst bed to improve process heat recovery and production of reforming products. Advantageously, existing reforming processes may be economically revamped to embodiments disclosed herein by adding additional catalyst volume via the additional reactor catalyst bed with corresponding interstage heating provided by revamping existing shock tube process coils in the common convection section to form the process heat recovery coil arrangement.

Referring to FIG. 1, an apparatus 10 for reforming of hydrocarbons in accordance with an exemplary embodiment is provided. The apparatus 10 includes a combined feed exchanger 11, a reforming heating-zone 12 that is in fluid communication with the combined feed exchanger 11, a reforming reaction-zone 14 that is in fluid communication with the combined feed exchanger 11 and the reforming heating zone 12, and a separation and product recovery zone 16 that is in fluid communication with the combined feed exchanger 11.

A reforming-zone feedstock 18 containing from $C_5$ to about $C_{11}$ hydrocarbons with a boiling point range of, for example, from about 70 to about 205° C. is introduced to the combined feed exchanger 11. The combined feed exchanger 11 operates to exchange heat between a reforming-zone effluent 20 and the reforming-zone feedstock 18. In an exemplary embodiment, upstream from the combined feed exchanger 11, a recycle $H_2$, $C_6^-$ hydrocarbon-containing net gas stream 22 from the separation and product recovery zone 16 is combined with the reforming-zone feedstock 18 to form a combined feed stream 24. As such, the combined feed stream 24 is introduced to the combined feed exchanger 11 for indirect heat exchange with the reforming-zone feedstock 18. As illustrated, a partially heated reforming-zone feed stream 26 is removed from the combined feed exchanger 11. In an exemplary embodiment, the partially heated reforming-zone feed stream 26 has a temperature of from about 150 to about 300° C.

The partially heated reforming-zone feed stream 26 is passed along to the reforming heating-zone 12. The reforming heating-zone 12 has a radiant furnace section 28 and a common convection section 30 that is in fluid communication with the radiant furnace section 28. In an exemplary embodiment and as illustrated, the radiant furnace section 28 includes 3 radiant heaters 32 that are separated from each other by walls 33 and that are configured to burn fuel gas 34 to generate process heat. Although the radiant furnace section 28 is illustrated as having a total of 3 radiant heaters 32, the radiant furnace section 28 can have 2 radiant heaters or more than 3 radiant heaters, e.g., 4 or more radiant heaters. The most upstream radiant heater 32 is a charge heater 36 and downstream from the charge heater 36 are interstage heaters 38 and 39. As will be discussed in further detail below, the charge heater 36 initially receives and heats the partially heated reforming-zone feed stream 26 and the interstage heaters 38 and 39 provide interstage heating during the reforming process to further drive the catalytic reforming reactions.

The radiant heaters 32 each have a plurality of burners 40. The fuel gas 34 is directed to the radiant heaters 32 by a plurality of control valves 41 and the burners 40 burn the fuel gas 34 to generate process heat, thereby forming hot flue gas. The hot flue gas comprises various combustion products such as carbon dioxide ($CO_2$), carbon monoxide (CO), water ($H_2O$), and the like. In an exemplary embodiment, the hot flue gas has a temperature of at least about 650° C., such as from about 650 to about 900° C. as it rises from the radiant furnace section 28 up into the common convection section 30.

Figure 2:
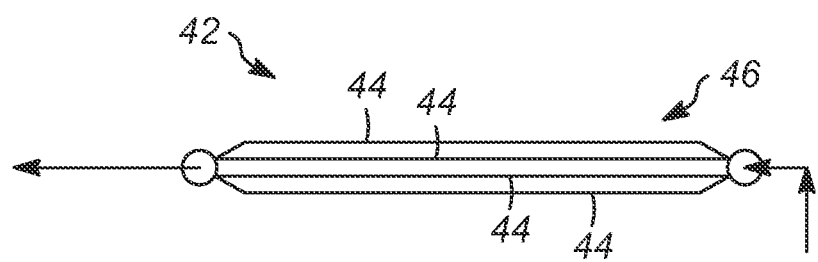
FIG. 2 schematically illustrates a portion of an apparatus for reforming of hydrocarbons including a process heat recovery coil arrangement in accordance with another exemplary embodiment.

Disposed in the common convection section 30 is a process heat recovery coil arrangement 42. As illustrated, the process heat recovery coil arrangement 42 is positioned directly over the radiant heaters 32 to efficiently recover heat from the rising hot flue gas. In an exemplary embodiment, the process heat recovery coil arrangement 42 comprises a plurality of spaced apart tubes 44 to allow the hot flue gas to readily advance over the outer surfaces of the tubes 44 for heat recovery. In one embodiment, the tubes 44 have substantially smooth outer cylindrical surfaces to facilitate the hot flue gas advancing over the tubes 44 for heat transfer. As illustrated in FIG. 1, the tubes 44 are substantially parallel to each other extending substantially along a U-shaped path to define a "hairpin coil configuration" 45. Alternatively and as illustrated in FIG. 2, the tubes 44 are substantially parallel to each other and may extend in substantially the same direction to define a "straight-through coil configuration" 46. Other configurations for the tubes 44 may also be used.

Referring back to FIG. 1, the partially heated reforming-zone feed stream 26 is advanced through the charge heater 36 to form a heated reforming-zone feed stream 48. In an exemplary embodiment, the heated reforming-zone feed stream 48 has a temperature of from about 490 to about 570° C. The heated reforming-zone feed stream 48 is removed from the radiant furnace section 28 and is passed along to the reforming reaction-zone 14.

The reforming reaction-zone 14 has a plurality of staged reactor catalyst beds 50 (e.g., catalyst beds contained in corresponding reactor vessels) correspondingly in fluid communication with the radiant heaters 32 and an additional reactor catalyst bed 52 (e.g., catalyst bed contained in an additional reactor vessel) that is in fluid communication with the process heat recovery coil arrangement 42. Although the plurality of staged reactor catalyst beds 50 is illustrated as having a total of 3 staged reactor catalyst beds 50, the plurality of staged reactor catalyst beds 50 can have 2 staged reactor catalyst beds or more than 3 staged reactor catalyst beds, e.g., 4 or more staged reactor catalyst beds. Each of the staged reactor catalyst beds 50 and the additional reactor catalyst beds 52 contain a reforming catalyst as is well known in the art and is operating at reforming conditions. In an exemplary embodiment, the reforming conditions include a reactor temperature of from about 490 to about 570° C. As illustrated and is known in the art, the staged reactor catalyst beds 50 are stacked on top of each other to facilitate movement of the reforming catalyst between the staged reactor catalyst beds 50 to facilitate regeneration of the reforming catalyst via a regeneration unit (not shown).

The heated reforming-zone feed stream 48 is passed to a first stage reactor catalyst bed 54 of the staged reactor catalyst beds 50 and contacts the reforming catalyst at the reforming conditions effective to partially reform the heated reforming-zone feed stream 48 to form a partially reformed effluent 56. Due to the endothermic catalytic reforming reactions, the partially reformed effluent 56 is at a relatively low temperature and requires interstage heating to further drive the catalytic reforming reactions. In an exemplary embodiment, the partially reformed effluent 56 has a temperature of from about 400 to about 480° C.

The partially reformed effluent 56 is removed from the first stage reactor catalyst bed 54 and is passed through the interstage heater 38 to form a heated partially reformed effluent 58. In an exemplary embodiment, the heated partially reformed effluent 58 has a temperature of from about 490 to about 570° C. The heated partially reformed effluent 58 is passed to an interstage reactor catalyst bed 60 of the staged reactor catalyst beds 50. The heated partially reformed effluent 58 contacts the reforming catalyst at the reforming conditions effective to further partially reform the heated partially reformed effluent 58 to form a partially reformed effluent 62. In an exemplary embodiment, the partially reformed effluent 62 has a temperature of from about 400 to about 480° C.

The partially reformed effluent 62 is removed from the interstage reactor catalyst bed 60 and is passed through the interstage heater 39 for interstage heating to form a heated partially reformed effluent 66. In an exemplary embodiment, the heated partially reformed effluent 66 has a temperature of from about 490 to about 570° C. The heated partially reformed effluent 66 is passed to an interstage reactor catalyst bed 68 of the staged reactor catalyst beds 50. The heated partially reformed effluent 66 contacts the reforming catalyst at the reforming conditions effective to further partially reform the heated partially reformed effluent 66 to form a partially reformed effluent 70. In an exemplary embodiment, the partially reformed effluent 70 has a temperature of from about 400 to about 480° C.

The partially reformed effluent 70 is removed from the interstage reactor catalyst bed 68 and is advanced towards the process heat recovery coil arrangement 42. In an exemplary embodiment and as illustrated, a bypass 72 may be used to divert a portion 74 of the partially reformed effluent 70 past the process heat recovery coil arrangement 42. At least a portion 76 of the partially reformed effluent 70 is introduced to the process heat recovery coil arrangement 42. In an exemplary embodiment, the portions 74 and 76 each independently have a mass flow rate of from about 60 to about 100% of the total mass flow rate of the partially reformed effluent 70.

In an exemplary embodiment, at least the portion 76 of the partially reformed effluent 70 is passed through the tubes 44 of the process heat recovery coil arrangement 42 for interstage heating and may be combined with the portions 74 to form a heated partially reformed effluent 78. In an exemplary embodiment, the heated partially reformed effluent 78 has a temperature of from about 490 to about 570° C. The heated partially reformed effluent 78 is passed to the additional reactor catalyst bed 52. The heated partially reformed effluent 78 contacts the reforming catalyst at a reforming conditions effective to further reform the heated partially reformed effluent 78 to form the reforming-zone effluent 20. In an exemplary embodiment, the reforming-zone effluent 20 comprises $H_2$, $C_5^+$ hydrocarbons including aromatics, and $C_4^-$ hydrocarbons.

The reforming-zone effluent 20 is passed along to the combined feed exchanger 11. As noted above, in the combined feed exchanger 11, heat from the reforming-zone effluent 20 is exchanged with the reforming-zone feedstock 18 (e.g., combined feed stream 24) to form a partially cooled reforming-zone effluent 80. In an exemplary embodiment, the partially cooled reforming-zone effluent 80 is a two phase liquid-gas stream that is still relatively hot in which hydrogen and the lighter hydrocarbons are predominately in the gas phase and the heavier hydrocarbons are predominately in the liquid phase. In one embodiment, the partially cooled reforming-zone effluent 80 has a temperature of at least about 80° C., such as from about 80 to about 250° C.

The partially cooled reforming-zone effluent 80 is passed along to the separation and product recovery zone 16. The separation and product recovery zones 16 is configured (e.g., includes fractionation and/or re-contacting subzones) to separate the partially cooled reforming-zone effluent 80 into the recycle $H_2$, $C_6^-$ hydrocarbon-containing net gas stream 22, a $C_3/C_4$ hydrocarbon-rich LPG stream 82, and a $C_5^+$ hydrocarbon-rich reformate stream 84.

Accordingly, apparatuses and methods for reforming of hydrocarbons have been described. The exemplary embodiments taught herein provide a reforming heating-zone that heats a reforming-zone feedstock that contains ($C_5$-$C_{11}$) hydrocarbons. The reforming heating-zone has a radiant furnace section that burns fuel gas to form hot flue gas and generate process heat to form a heated reforming-zone feed stream. A common convection section is in fluid communication with the radiant furnace section to receive the hot flue gas. Disposed in the common convection section is a process heat recovery coil arrangement for recovering heat from the hot flue gas. A reforming reaction-zone receives the heated reforming-zone feed stream. The reforming reaction-zone has a plurality of staged reactor catalyst beds that is in fluid communication with the radiant furnace section. An additional reactor catalyst bed is in fluid communication with the process heat recovery coil arrangement. The plurality of staged reactor catalyst beds and the additional reactor catalyst bed cooperate to reform the heated reforming-zone feed stream while the reforming heating-zone including the radiant furnace section and the process heat recovery coil arrangement provide heating including interstage heating to drive the catalytic reforming reactions to form a reforming reaction-zone effluent.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An apparatus for reforming of hydrocarbons, the apparatus comprising:
    a reforming heating-zone configured to heat a reforming-zone feedstock that contains ($C_5$-$C_{11}$) hydrocarbons to form a heated reforming-zone feed stream, wherein the reforming heating-zone has a radiant furnace section that is configured to burn fuel gas to form hot flue gas and a common convection section that is in fluid communication with the radiant furnace section to receive the hot flue gas, and wherein the reforming heating-zone comprises a process heat recovery coil arrangement disposed in the common convection section for recovering heat from the hot flue gas; and
    a reforming reaction-zone that receives the heated reforming-zone feed stream and that comprises:
        a plurality of staged reactor catalyst beds that is in fluid communication with the radiant furnace section; and
        an additional reactor catalyst bed that is in fluid communication with the process heat recovery coil arrangement disposed within the common convection section, wherein the reforming heating-zone, the plurality of staged reactor catalyst beds, and the additional reactor catalyst bed are cooperatively configured for interstage heating and reforming of the heated reforming-zone feed stream to form a reforming reaction-zone effluent that comprises $H_2$, $C_5^+$ hydrocarbons including aromatics, and $C_4^-$ hydrocarbons.

2. The apparatus of claim 1, wherein the radiant furnace section is configured to burn the fuel gas such that the hot flue gas has a temperature of about 650° C. or greater in the common convection section.

3. The apparatus of claim 1, wherein the radiant furnace section is configured to burn the fuel gas such that the hot flue gas has a temperature of from about 650 to about 900° C. in the common convection section.

4. The apparatus of claim 1, wherein the process heat recovery coil arrangement comprises a plurality of spaced apart tubes.

5. The apparatus of claim 4, wherein the spaced apart tubes are substantially parallel to each other extending substantially in the same direction to define the process heat recovery coil arrangement having a straight-through coil configuration.

6. The apparatus of claim 4, wherein the spaced apart tubes are substantially parallel to each other extending substantially along a U-shaped path to define the process heat recovery coil arrangement having a hairpin coil configuration.

7. The apparatus of claim 4, wherein the spaced apart tubes each have a substantially smooth outer cylindrical surface.

8. The apparatus of claim 1, wherein the process heat recovery coil arrangement is disposed over the radiant furnace section.

9. The apparatus of claim 1, wherein the additional reactor catalyst bed contains reforming catalyst and is configured to operate at reforming conditions effective to form the reforming reaction-zone effluent.

10. The apparatus of claim 9, wherein the reforming conditions include a reactor temperature of from about 490 to about 570° C.

11. An apparatus for reforming of hydrocarbons, the apparatus comprising:
    a combined feed exchanger configured for indirect heat exchange between a combined feed stream and a reforming reaction-zone effluent to form a partially heated reforming-zone feed stream, wherein the combined feed stream comprises a recycle $H_2$, $C_6^-$ hydrocarbon-containing net gas stream and a reforming-zone feedstock that contains ($C_5$-$C_{11}$) hydrocarbons;
    a reforming heating-zone in fluid communication with the combined feed exchanger and comprising:
        a plurality of radiant heaters including a charge heater and an interstage heater, wherein the plurality of radiant heaters are configured to burn fuel gas to form hot flue gas, and wherein the charge heater is configured to heat the partially heated reforming-zone feed stream to form a heated reforming-zone feed stream; and
        a process heat recovery coil arrangement configured to recover heat from the hot flue gas; and
    a reforming reaction-zone comprising:
        a plurality of staged reactor catalyst beds including a first stage reactor catalyst bed that is in fluid communication with the charge heater and an interstage stage reactor catalyst bed that is in fluid communication with the interstage heater, wherein the plurality of radiant heaters and the plurality of staged reactor catalyst beds are cooperatively configured for interstage heating and partially reforming of the heated reforming-zone feed stream to form a partially reformed effluent; and
        an additional reactor catalyst bed that is in fluid communication with the process heat recovery coil arrangement disposed within the common convection section, wherein the process heat recovery coil arrangement and the additional reactor catalyst bed are cooperatively configured for interstage heating and reforming of the partially reformed effluent to form the reforming reaction-zone effluent that comprises $H_2$, $C_5^+$ hydrocarbons including aromatics, and $C_4^-$ hydrocarbons.

12. The apparatus of claim 11, wherein the combined feed exchanger is configured to form the partially heated reforming-zone feed stream having a temperature of from about 150 to about 300° C.

13. The apparatus of claim 11, wherein the charge heater is configured to form the heated reforming-zone feed stream having a temperature of from about 490 to about 570° C.

14. The apparatus of claim 11, wherein the interstage stage reactor catalyst bed is a downstream-most reactor catalyst bed of the plurality of staged reactor catalyst beds, and the additional reactor catalyst bed is downstream from the interstage stage reactor catalyst bed.

15. The apparatus of claim 11, wherein the process heat recovery coil arrangement is configured to receive and heat a first portion of the partially reformed effluent to form a heated partially reformed effluent, and the apparatus further comprises a bypass for diverting a second portion of the partially reformed effluent past the process heat recovery coil arrangement to be combined with the heated partially reformed effluent for introduction to the additional reactor catalyst bed.

16. The apparatus of claim 15, wherein the first portion has a first mass flow rate of from about 60 to about 100% of a total mass flow rate of the partially reformed effluent.

17. The apparatus of claim 15, wherein the second portion has a second mass flow rate of about 60 to about 100% of a total mass flow rate of the partially reformed effluent.

18. The apparatus of claim 11, wherein the plurality of staged reactor catalyst beds includes a total of 3 or 4 stage reactor catalyst beds.

19. The apparatus of claim 11, wherein the plurality of radiant heaters includes a total of 3 to 5 radiant heaters.

20. A method for reforming of hydrocarbons, the method comprising the steps of:
  burning fuel gas to form a hot flue gas and heat in a reforming-zone, comprised of a radiant zone and a convection zone, a feedstock that contains ($C_5$-$C_{11}$) hydrocarbons to form a heated reforming-zone feed stream;
  partially reforming the heated reforming-zone feed stream to form a partially reformed effluent;
  advancing the partially reformed effluent through a process heat recovery coil arrangement in the convection zone that is recovering heat from the hot flue gas to form a heated partially reformed effluent; and
  contacting the heated partially reformed effluent with reforming catalyst at reforming conditions effective to form a reforming reaction-zone effluent that comprises $H_2$, $C_5^+$ hydrocarbons including aromatics, and $C_4^-$ hydrocarbons.

* * * * *